United States Patent
Jokinen et al.

(10) Patent No.: US 9,729,868 B2
(45) Date of Patent: Aug. 8, 2017

(54) METHOD, APPARATUS AND COMPUTER PROGRAM PRODUCT FOR TESTING A VIDEO SYSTEM

(71) Applicant: OptoFidelity Oy, Tampere (FI)

(72) Inventors: Kimmo Jokinen, Tampere (FI); Jere Paloniemi, Tampere (FI)

(73) Assignee: OptoFidelity Oy, Tampere (FI)

( * ) Notice: Subject to any disclaimer, the term of this patent is extended or adjusted under 35 U.S.C. 154(b) by 0 days.

(21) Appl. No.: 15/386,602

(22) Filed: Dec. 21, 2016

(65) Prior Publication Data

US 2017/0195669 A1 Jul. 6, 2017

(30) Foreign Application Priority Data

Dec. 23, 2015 (EP) ..................................... 15397546

(51) Int. Cl.
*H04N 17/02* (2006.01)
*H04N 17/00* (2006.01)

(52) U.S. Cl.
CPC ........... *H04N 17/02* (2013.01); *H04N 17/002* (2013.01)

(58) Field of Classification Search
CPC ...... H04N 17/00; H04N 17/02; H04N 17/002; H04N 2017/006; H04N 17/04
USPC .......... 348/180, 192; 702/108; 714/712, 715
See application file for complete search history.

(56) References Cited

U.S. PATENT DOCUMENTS

2015/0097970 A1 4/2015 Zeng
2016/0205397 A1* 7/2016 Martin ................... H04N 17/04
348/192

FOREIGN PATENT DOCUMENTS

CA 2541560 A1 9/2007
EP 0888019 A1 12/1998

OTHER PUBLICATIONS

Extended European Search Report, Application No. 15397546.1-1902, mailed Jun. 15, 2016, 8 pages.

* cited by examiner

*Primary Examiner* — Sherrie Hsia
(74) *Attorney, Agent, or Firm* — Ziegler IP Law Group, LLC (57) ABSTRACT

Testing a video transmission system includes generating an optical signal and varying the colour by sweeping through a colour range. A first optical sensor captures the optical signal at intervals to generate frames. Transmitted frames are received by a second communication device. Received frames are provided to a display of the second communication device to reconstruct the frames. Colour information of frames displayed is obtained by a second optical sensor. Colour information of successive reconstructed frames is compared to determine deviation in capture rate of two successive frames of the first optical sensor, delay between capturing a frame by the first optical sensor and displaying the frame by the display, deviation in display rate of two successive frames displayed by the display and/or a loss of a frame. Audio information may be utilized in video and, conversational latency, synchronization between video and audio, and audio synchronization measurements.

15 Claims, 8 Drawing Sheets

Fig. 7d

METHOD, APPARATUS AND COMPUTER PROGRAM PRODUCT FOR TESTING A VIDEO SYSTEM

TECHNICAL FIELD

The aspects of the disclosed embodiments relate to a method for testing a video transmission system. The aspects of the disclosed embodiments also relate to an apparatus for testing a video transmission system. The aspects of the disclosed embodiments further relate to a computer program product for testing a video transmission system.

BACKGROUND INFORMATION

Apparatuses and methods have been developed for testing devices having a display without opening the device or connecting any measuring equipment to the device. Such apparatuses may capture frames of the display with an image sensor. Captured frame information is then analysed to determine the quality of video playback. In some methods a certain area of the display is used to display a frame indicator. The frame indicator is for example a square which is shown as a white square by every other frame and as a black square by every other frame. Hence, the area can be imaged at intervals wherein the frame rate can be detected on the basis of the frequency of the varying black and white squares. However, such systems are only capable of testing a receiving device but are not capable of testing a transmission path from a sending device to the receiving device.

Therefore, there is a need to find an improved method, system and apparatus in which video capturing, transmission and/or receiving quality measures may be more reliably performed. The method should also enable the use of very simple test setup.

In this context the term frame is one set of visual information in matrix form to be shown by a display. The frame may be a part of a video content i.e. one frame of a sequence of frames, a picture, etc. The term dropped frame or an omitted frame means a frame of a sequence of frames which is not displayed by the display due to errors in capturing, transmission, reception and/or displaying. The reason for dropping the frame may be, for example, that the capturing device is not fast enough, a transmission path has not enough bandwidth or is not error prone, an input buffer of a receiving device or the display is full, the device controlling the display is occupied by other simultaneous tasks etc. The frame may also be called as an image in this application.

SUMMARY

One aim of the aspects of the disclosed embodiments is to provide an improved method and apparatus for testing a video transmission system and apparatuses of the video transmission system. Testing of a video transmission system means in this context e.g. testing the performance of a video capturing device, a transmission system, a receiving device and/or a display to be used to playback the video.

According to a first aspect there is provided a method for testing comprising:
generating optical signal the colour of which varies by sweeping through a certain colour range;
capturing the optical signal at intervals by a first optical sensor to generate frames from the captured optical signal;
transmitting the frames by a first communication device to be received by a second communication device;
receiving one or more of the transmitted frames by the second communication device;
providing the received frames to a display of the second communication device to reconstruct the frames on the display;
obtaining by a second optical sensor colour information of frames displayed by the display at intervals;
comparing colour information of successive reconstructed frames to determine one or more of the following:
deviation in capture rate of two successive frames of the first optical sensor;
a delay between capturing a frame by the first optical sensor and displaying the frame by the display;
deviation in display rate of two successive frames displayed by the display;
a loss of a frame.

According to a second aspect there is provided a system for testing comprising:
an optical signal generating device adapted to generate optical signal the colour of which varies by sweeping through a certain colour range;
a first optical sensor adapted to capture the optical signal at intervals to generate frames from the captured optical signal;
a first communication device adapted to transmit the frames to be received by a second communication device;
the second communication device (6) comprising a receiver for receiving one or more of the transmitted frames and a display to reconstruct the received frames on the display;
wherein the system further comprises:
a second optical sensor adapted to obtain colour information of frames displayed by the display at intervals;
a comparator adapted to compare colour information of successive reconstructed frames to determine one or more of the following:
deviation in capture rates of two successive frames of the first optical sensor;
a delay between capturing a frame by the first optical sensor and displaying the frame by the display;
deviation in display rates of two successive frames displayed by the display;
a loss of a frame.

According to a third aspect there is provided an apparatus for testing comprising:
an optical sensor adapted to obtain colour information of frames displayed by a display of a communication device, the frames carrying information formed on the basis of an optical signal of variable colour captured by a capturing device ; and
a comparator adapted to compare the colour information of successive frames reconstructed and displayed by the communication device to determine one or more of the following:
deviation in capture rates of two successive frames displayed by the display;
a delay between capturing a frame displayed by the display and displaying the frame;
deviation in display rates of two successive frames displayed by the display;
a loss of a frame.

According to a fourth aspect there is provided a computer program product for testing including one or more sequences of one or more instructions which, when executed by one or more processors, cause an apparatus or a system to perform at least the following:

obtain colour information of frames displayed by a display of a communication device, the frames carrying information formed on the basis of an optical signal of variable colour captured by a capturing device (3); and using the colour information of successive frames reconstructed and displayed by the communication device to determine one or more of the following:

deviation in capture rates of two successive frames displayed by the display;

a delay between capturing a frame displayed by the display and displaying the frame;

deviation in display rates of two successive frames displayed by the display;

a loss of a frame:

Some advantageous embodiments are defined in the dependent claims.

Some advantages may be achieved by the aspects of the disclosed embodiments. For example, an example setup may allow measuring both a camera and display performance. Some common temporal errors may thus be detected such as uneven camera capturing properties i.e. uneven frames per second (FPS), such as caused e.g. by badly behaving auto exposure algorithms. These errors may show up as large variations in frame capture intervals in measurement. Also dropped frames in transport, such as caused by lack of bandwidth, may be detected. This may manifest as capture intervals that are twice as long as normal. Furthermore, uneven display rates (in frames per second), such as caused by insufficient processor performance, may be detected. This may show up as large variations in frame display intervals.

In accordance with an embodiment, audio information may be utilized in video latency and audio synchronization measurements. For example, the colour cycle direction may be switched at the same time as an audio marker is sent. By using the absolute value of the phase angle difference in the frame change detector it is unaffected by the direction change. It may then be determined when the colour cycle have been reversed and measure the time difference between the detected change of direction and the received audio beep. This time difference may reveal the synchronization difference between audio and video signals (a.k.a. lip sync). This arrangement may also make also possible to measure a so called conversational latency (a.k.a. mouth to ear latency or end-to-end latency) which describes the time it takes from the transmission of audio (and video) information to reconstruction the audio (and video) information at the receiving end.

DESCRIPTION OF THE DRAWINGS

In the following the aspects of the disclosed embodiments will be described in more detail with reference to the appended drawings, in which.

DETAILED DESCRIPTION

Figure 1A:
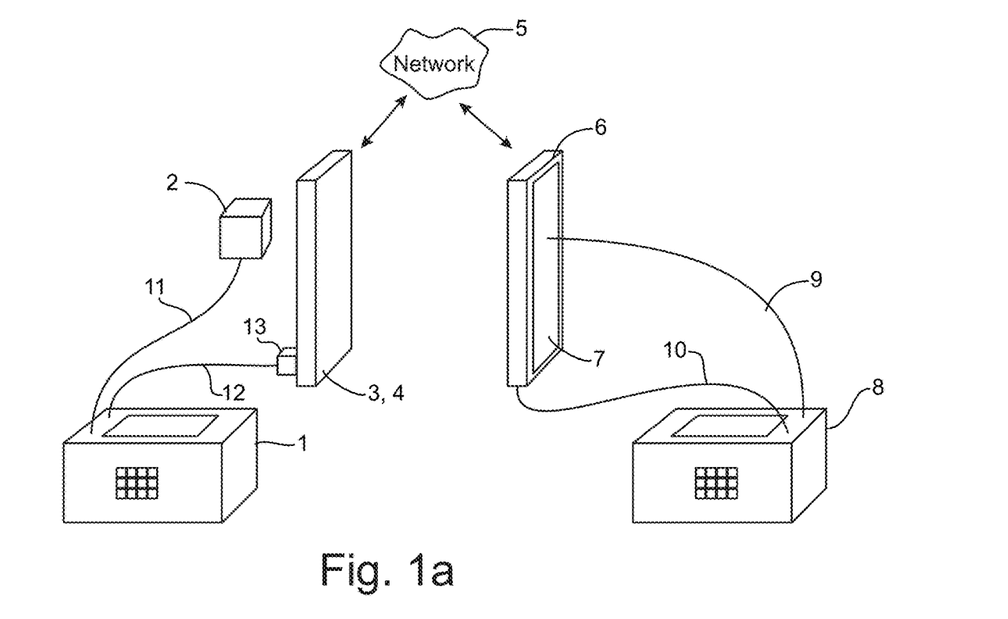
FIG. 1a is a conceptual drawing of a measurement setup according to an example embodiment.
Figure 5A:
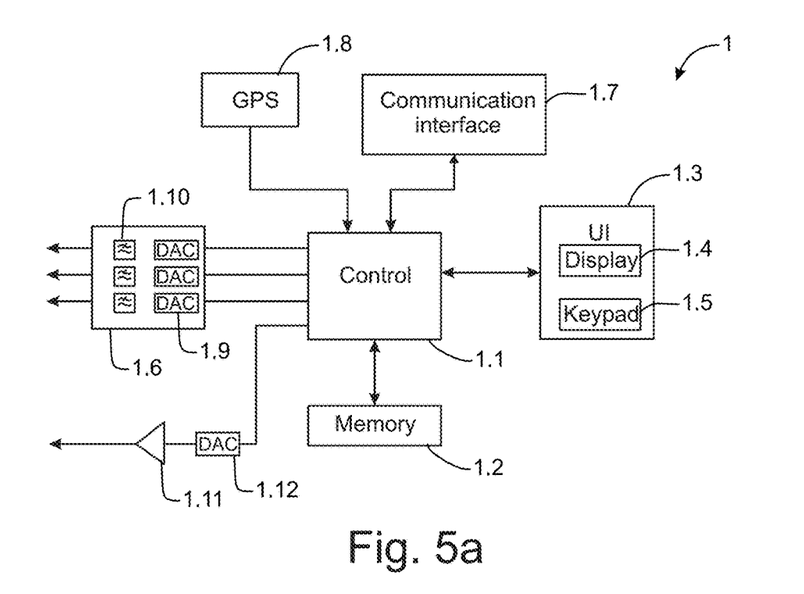
FIG. 5a depicts as a simplified block diagram a controlling device according to an example embodiment.

In the following some example embodiments will be described. FIG. 1a illustrates an example of a measurement setup according to an example embodiment and FIG. 5 is a simplified block diagram of an apparatus 8 according to an example embodiment of the present disclosure. The setup comprises a controlling device 1 which is adapted to control an optical signal generating device 2 to generate sequentially varying optical signal. The system may further comprise a capturing device 3 which is adapted to capture frames from the optical signal generated by the optical signal generating device 2. The capturing device 3 may comprise a first communication device 4 or the first communication device 4 may be separate from the capturing device 3. The first communication device 4 is adapted to receive frame information from the capturing device 3 and transmit the frame information to a communication channel 5. The communication channel 5 may be any kind of a communication system which is able to transmit frame information from the first communication device 4 to a second communication device 6. The second communication device 6 is adapted to receive frame information transmitted by the first communication device 4 via the communication channel 5. The second communication device 6 may also be adapted to provide received frame information to a display 7 or the display 7 may be part of a separate device (not shown). The measurement setup according to the example of FIG. 1a also comprises a measurement device 8 capable of measuring and analysing frame information shown by the display 7. The first communication device 4 and the second communication device 6 may also be called as a transmitting device 4 and a receiving device 6, respectively.

In the following the operation of the measurement setup of FIG. 1a is described in more detail. It is assumed, without limiting the scope of the aspects of the disclosed embodiments, that the capturing device 3 and the first communication device 4 are part of the same apparatus. It is further assumed, without limiting the scope of the aspects of the disclosed embodiments, that the display 7 is a part of the second communication device 6.

Figure 2A:
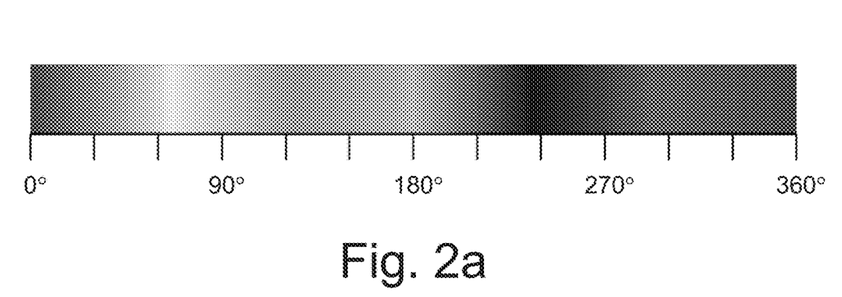
FIG. 2a illustrates an example of a colour hue as a grey scale image, in accordance with an embodiment.

The controlling device 1 generates a varying signal to the optical signal generating device 2 to generate an optical signal which changes the colour according to a predetermined manner. As an example, the hue of the colour continuously changes during the test so that a certain colour range is swept through by the optical signal generating device 2 during one sequence. The sequence may be repeated a number of times. As an example, the colours may follow the so-called hue-saturation-lightness (HSL) or the hue-saturation-value (HSV) representations of the RGB colour model (Red-Green-Blue). According to these representations different colours may be presented by an angle value between 0° and 360°. In these representations the values 0° and 360° mean purely red colour. To produce different colours according to the RBG colour model the optical signal generating device 2 is able to produce three different light signals, namely red, green and blue, and individually vary the intensity of these light signals. Hence, to produce the red colour with full intensity, only the red light is generated, to produce the green colour with full intensity, only the green light is generated, and to produce the blue colour with full intensity, only the blue light is generated. Other colours may be generated by adjusting the brightness of the red, green and blue light accordingly. FIG. 2*a* illustrates an example of such colour hue as a grey scale image. Different shades of grey illustrate different colours of the hue.

In practical implementations it may not be possible to linearly produce the colour hue so that each possible number of different colours will be generated. However, it may be sufficient to generate colours of the colour hue so that a certain number of different colours of the hue will be generated. For example, the 360° range may be divided into 360 steps wherein each consecutive colour may differ 1° from a previous colour, or the 360° range may be divided into 60 steps wherein each consecutive colour may differ 6° from a previous colour, etc. In other words, the optical signal generating device 2 may generate the colour hue so that each consecutive colour differs from a previous colour by about one degree, wherein 360 different colours, one at a time, may be generated by the optical signal generating device 2 during one sequence. In the other example in which each two successive colours differ about 6°, one sequence of colours would comprise 60 different colours. This optical colour information captured by the capturing device 3 is also called as a marker in this application.

In accordance with an embodiment, the optical signal generating device 2 generates an optical signal in which the intensity of the three colours red, green and blue changes according to a sine wave in such a way that the phase angle of a maximum (and minimum) intensities of each of the three colours has about 120° phase difference. For example, the phase of the blue colour lags about 120° of the phase of the red colour, and the phase of the green colour lags about 120° of the phase of the blue colour. FIG. 2*c* illustrates waveforms of intensities of these three different colours to generate the colour hue, in accordance with an embodiment. The waveform of the red component is referred with the label 20, the waveform of the blue component is referred with the label 22, and the waveform of the green component is referred with the label 24.

The capturing device 3 may be able to have a fixed capturing rate or it may be able to set the capturing rate e.g. from a set of possible capturing rates. As an example, the capturing rate may be 10 fps (frames per second), 20 fps, 24 fps, 25 fps, 50 fps or 60 fps. The capturing rate may be regarded as an expected capturing rate.

The frames captured by the capturing device 3 may be provided to an application in the capturing device 3, wherein also image processing capability of the application may be measured by the setup. The application may, for example, be a video call application, a video conferencing application, a video over LTE application, a WiFi end-to-end application, a multimedia messaging application, etc.

In the following the operation of the system of FIG. 1*a* will be described in more detail. The varying signal generated by the controlling device 1 may be coupled to the optical signal generating device 2 e.g. via a cable 11. On the basis of this signal the optical signal generating device 2 generates the optical signal which varies its colour so that the whole hue will be swept through during one sequence. One sequence, which may also be called as one colour cycle, may last several seconds, such as 1 s, 2 s, 3 s, or may be shorter than a second or longer than 3 s. In accordance with an embodiment, the length of one sequence is such that the presentation time of one colour of the sequence is shorter than the capturing rate of the capturing device 3. This may assure that two consecutive frames captured by the capturing device 3 will have different colours from the optical signal generating device 2. As a non-limiting example, the capturing rate of the capturing device 3 is 20 fps, wherein the optical signal generating device 2 should change the colour faster than 20 times per second. If the colour hue produced by the optical signal generating device 2 were divided into 360 different colours, that would mean that the length of the sequence would be less than 18 seconds (=360/20). However, it may be advantageous to set the length of the sequence shorter than that so that the optical signal generating device 2 changes its colour more than once within the capturing rate of the capturing device 3.

When the capturing device 3 captures the image produced by the optical signal generating device 2, the capturing device 3 may average the colour value over its exposure time. This exposure time may be any value between 0 and the frame interval. The exposure time may not be known by the optical signal generating device 2 and may not be controllable. Thus, the colour values should be decodable no matter at what point they were captured. FIG. 2*c* also illustrates the exposure time as a starting moment 23 and a stopping moment 24, wherein the capturing device 3 may produce an average intensity value for each of the three colours. In FIG. 2*c* these are illustrated as dotted lines: 25 for the red colour, 26 for the blue colour and 27 for the green colour.

The above described sine wave based generation of the colour hue may provide some advantages. For example, averaging the colour value over a short interval may give a value close to the instantaneous value at the middle of the interval, and at least one colour channel may change rapidly enough at any time. However, it should be noted here that the three-phase sine wave cycle is not the only possible waveform, but may be one of the simplest to specify and generate.

On the display side, detection of frame changes may rely on the colour difference between consecutive frames. The colour change should be large enough to be detectable but at the same time it may be desired to maximize the length of the full colour cycle. A larger colour cycle length may allow measurement of a larger range of camera framerates with a single target speed.

Figure 2B:
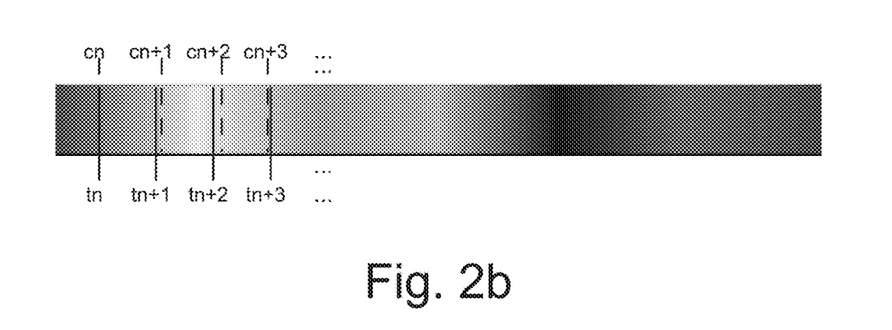
FIG. 2b illustrates as an example some moments of time of frame capturing with respect to a colour hue generated by an optical signal generating device.
Figure 2C:
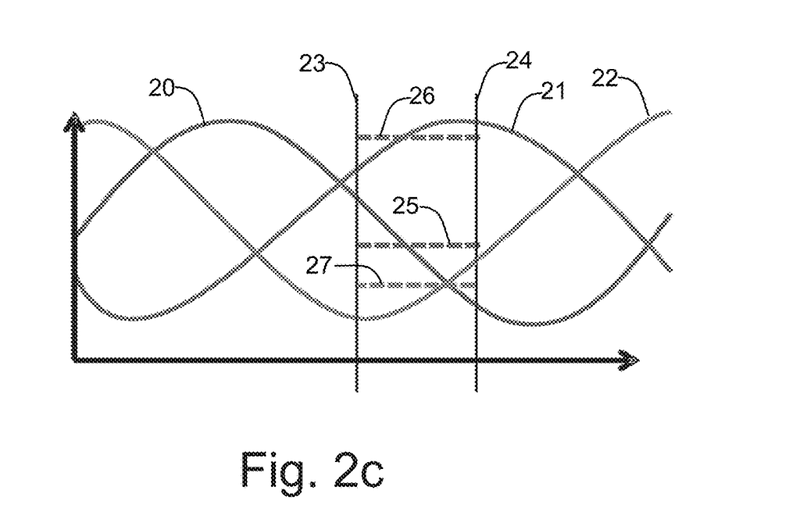
FIG. 2c illustrates as an example waveforms of intensities of three different colours to generate the colour hue, in accordance with an embodiment.

FIG. 2*b* illustrates as an example some moments of time when the capturing device 3 captures a frame from the light generated by the optical signal generating device 2. Some of these moments of time are labelled with reference numerals $t_n$, $t_{n+1}$, $t_{n+2}$, $t_{n+3}$ in FIG. 2b.

The capturing device 3 may be positioned so that a capturing element of the capturing device 3, such as a camera (not shown), is directed towards the optical signal generating device 2 so that the capturing element may capture images on the optical signal generated by the optical signal generating device 2, which may then be converted to frames to be transmitted.

The first communication device 4 transmits the captured frames (either frames captured by the image capturing device 3 or frames processed by the application) to the transmission channel 5 which forwards them to the second communication device 6 to be displayed by the display 7. The frame captured by the capturing device 3 and subsequently shown by the display 7 comprise the optical signal (visual information of a colour hue) at a certain location, or the whole frame may show the same colour. The measurement device 8 has an optical sensor 8.6 (e.g. a camera, a CCD sensor, a CMOS sensor, etc.) which is capable of producing e.g. RBG information on the basis of the colour signal. In an ideal system, when the colour signal generated by the signal generating device 2 sequentially goes through the colour hue (from 0° to 360°) also the optical sensor 8.6 should recognize the same sequence and produce corresponding electrical signals. However, in practical systems there may be some sources of error which may slightly affect to the accuracy of the reproduction of the optical signal. These kinds of errors may not vary greatly during the operation of the system, wherein the actual measurements should not be affected by such errors, because the purpose of the setup is not to measure how accurately the system is able to produce the colour of the optical signal, but to use the optical signals as an indicator of frame changes.

In a situation in which the captured frames are delivered to the receiving end fast enough so that the received frames may be displayed at certain rate, which may be regarded as an expected display rate, deviations from the correct display rate may reveal that the receiving device 6 and/or the display 7 may not be able to reproduce the frames fast enough to maintain the expected display rate.

The deviation in display rate may be determined e.g. as follows. Visual information displayed by the display 7 is captured by the measurement device 8 until a change in the colour of the visual information has been detected. Then, the moment of time of the change may be detected. This information may be indicative of a display time of one frame. Capturing the visual information displayed by the display 7 may be continued until another change in the colour of the visual information has been detected. The moment of time of this other change may also be detected. The moment of time of the other change may be indicative of a display time of another frame. Hence, using the difference between the display time of the second frame and the display time of the first frame an actual display rate may be found out. The deviation of display rate may be determined on the basis of the difference between the actual display rate and the expected display rate.

The information displayed by the display 7 or part of it may be transferred to the measurement device 8 e.g. by using an optical fibre 9. Hence, one end of the optical fibre 9 may be positioned near or on the surface of the display 7 at a location in which the colour hue will be shown. In accordance with an embodiment, the whole display 7 may show the colour hue, wherein the one end of the optical fibre 9 may be positioned almost at any location on the display 7.

Another end of the optical fibre 9 is coupled to a fibre receptacle 8.7 via which the optical signal may be forwarded to the optical sensor 8.6.

The measurement device 8 may measure and analyse frame information shown by the display 7. The measurement device 8 may detect when the colour of the colour identifier or the whole screen changes and use this information as an indication of a change of a frame shown by the display. Therefore, the measurement device 8 may also use timing information to determine the moments of time when the frame changes. The timing information may then be used to determine whether there are variations in the changes of frames. These variations may indicate that some parts of the frame transmission system are not able to always provide successive frames at correct moments.

The colour information of the colour identifier may be used to determine possible deviation in the capturing rate of frames. This may be performed e.g. in such a way that the measurement device 8 is aware of the predetermined sequence of colours and the pace of the optical signal which the optical signal generating device 2 produces. As an example, let us assume that the expected capturing rate is 10 fps (=100 ms) and the pace in which the colour generated by the optical signal generating means 2 changes is 20 ms and that 360 different colours are generated, which would mean that the 360° range is divided into 360 steps wherein each consecutive colour should differ 1° from a previous colour. Hence, colours of two successively captured frame should differ about 5° from each other. If the colour of successive frames received differs from what is expected, it may be assumed that the actual capturing rate differs from the expectation value. Therefore, comparing the measured colours of different frames may reveal the actual capturing rate of the capturing device 3. In FIG. 2b some examples of actual capturing moments with reference to the colour hue are indicated by lines $c_n$, $C_{n+1}$, $C_{n+2}$, $C_{n+3}$.

Colour information of successive received frames may also be used to determine whether each captured frame has been received or not. If one or more frames have been dropped the colour information of two successively received frames differs more than expected. The above described example and the capturing moments of FIG. 2b can be used as an example to clarify this. For example, if the frames captured at the moments $t_n$ and $t_{n+3}$ have been successfully received and displayed by the display 7, but the frames captured at moments $t_{n+1}$ and $t_{n+2}$ have not been received, the difference of colours of the frame captured at the moment $t_n$ and the frame captured at the moment $t_{n+3}$ differs about 15°. Therefore, because it was assumed to differ only about 5°, it may be deduced that two frames have been dropped in some part of the system.

In accordance with an embodiment, the optical sensor 8.6 may, for example, produce a signal for each colour which is indicative of the intensity of the colour in the captured image. In an ideal case, the optical sensor 8 would generate three different signals each following the waveform of the colour signals of FIG. 2c when sine waves were used. If these three waveforms were depicted in a three-dimensional coordinate system in which each coordinate axel corresponds with one particular colour, the three-phase sine would in ideal case form an ellipse when plotted in these three dimensions. However, due to distortions, non-linearities and other possible factors, the signals produced by the optical sensor 8.6 may not exactly correspond with the signals generated by the optical signal generating device 2, wherein the display colour response may distort this ellipse, both in shape and in the density of points along the curve.

Figure 6:
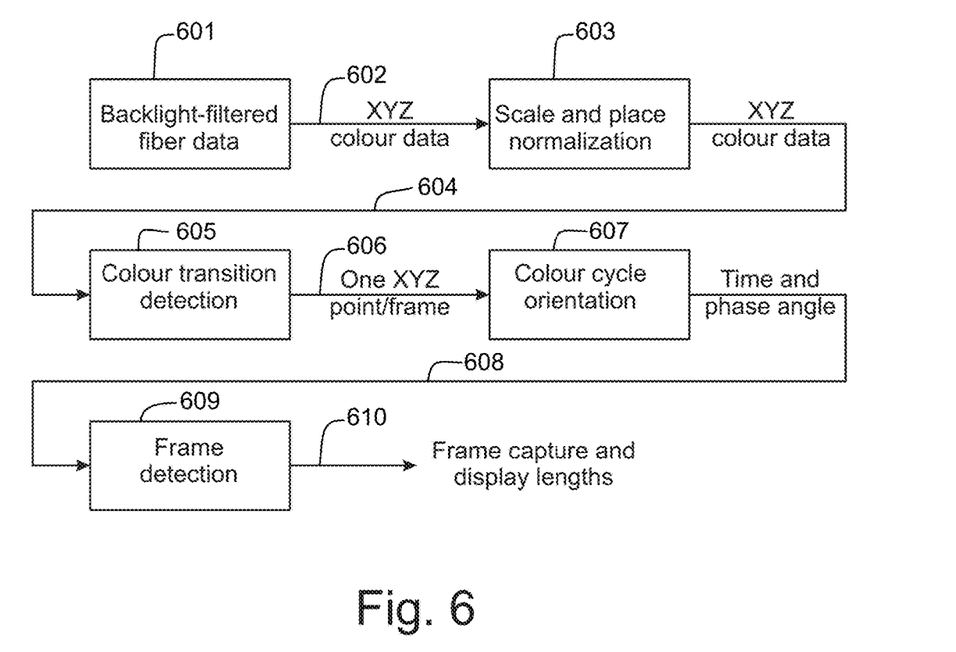
FIG. 6 illustrates some functional blocks of an apparatus for obtaining frame capturing and displaying information, in accordance with an embodiment.

FIG. 6 illustrates some functional blocks of an apparatus for obtaining frame capturing and displaying information, in accordance with an embodiment. The brightness of the information displayed on the display may vary e.g. due to changes in the brightness of a backlight. Hence, signals produced by the optical sensor 8.6 may be filtered (block 601 in FIG. 6) to reduce the effects of brightness variations. Furthermore, the colour data 602 may further be normalized so that minimum and maximum values lie within a certain range and/or scaled (block 603). The output of the filtering/ normali-zation may be, for example, a stream 604 of three colour values at a certain sample rate (e.g. 1 kHz or another appropriate value). These colour values may be converted to angle values so that they lie within the full circle i.e. 0°-360° (0-2π rad).

Figure 7A:
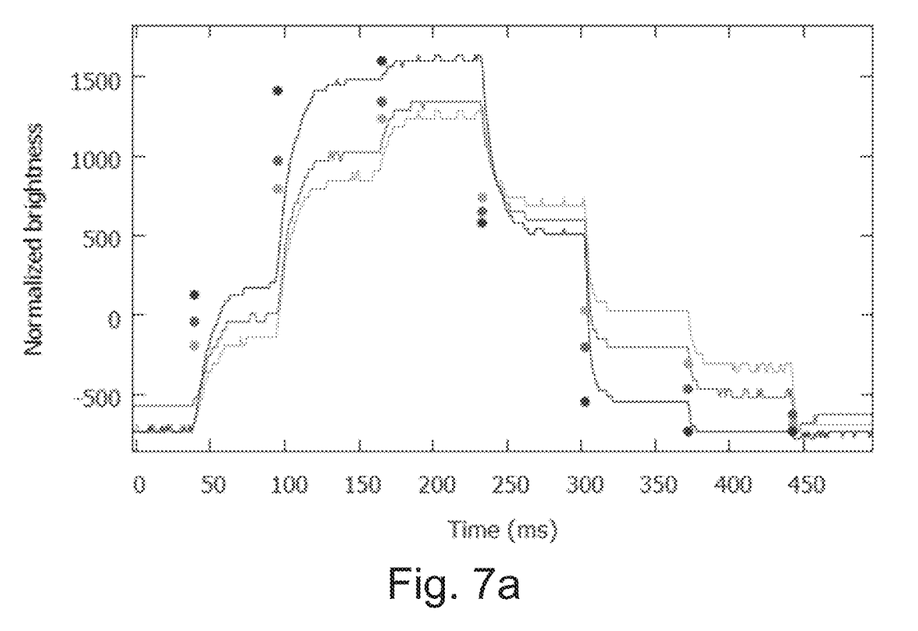
FIG. 7a depicts normalized colour data and stable values as they appear in time domain, in accordance with an embodiment.

As was mentioned above, the system may have non-linearities and other sources of inaccuracy wherein it may be desired to calibrate the system to eliminate or at least reduce the effect of such inaccuracies. For calibration purposes, the system may use a number of measurement results to find out how the actual colour circle appears at the measurement end. The measurement results may be the colour values represented in a three-dimensional coordinate system (in XYZ colour domain). FIG. 7a depicts normalized colour data (lines) and stable values (dots) given by a colour transition detector 605 as they appear in time domain. A colour cycle orientation 607 may be performed on the basis of the stable colour values 606 received from the colour transition detector 605. These values and their timestamps may correspond directly to frames on the display side. The function of the colour cycle orientation block is to take the colour values and calculate phase angles from them.

Figure 7B:
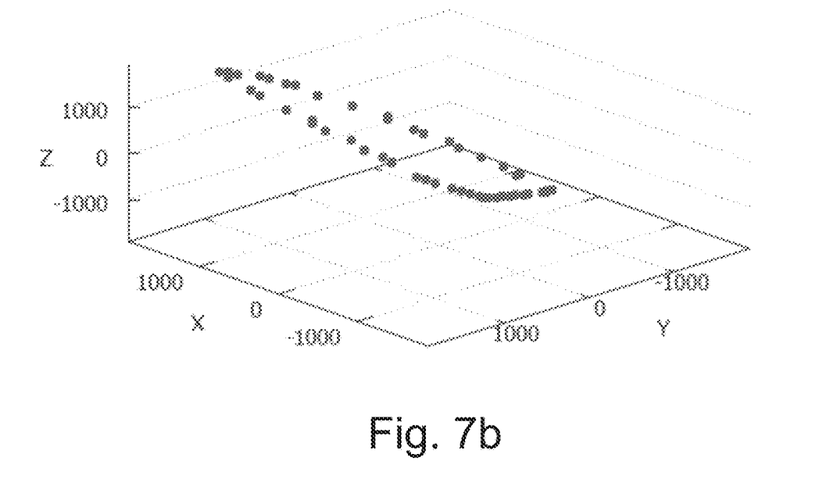
FIG. 7b shows the same data as the FIG. 7a, but points from multiple cycles have been plotted and time component has been removed.

The colour data may first be observed as an unordered set of three-dimensional points. All time and order information of the frames may be discarded for the purposes of calibration. This step relies on the even distribution of colour values along the cycle. The FIG. 7b shows the same data as the FIG. 7a, but points from multiple cycles have been plotted and time component has been removed. Now the distorted elliptical shape of the colour cycle becomes apparent. One object of the calibration is defining a function f: $R^3 \rightarrow$ [0 . . . 2π[, which maps the colour values to a phase angle along the cycle, i.e. orienting the cycle.

The cycle orientation may be accomplished as follows. Points are picked at regular spacing along the cycle and a polygon that approximates the cycle is obtained e.g. by using and solving a so called travelling salesman problem. Density of calibration points close to each polygon point may also calculated and angle values may be chosen so that the phase angle increases proportional to density at every point of the cycle. In order to keep the task feasible, a manageable number of representative points of the cycle may be defined. In practice up to 24 points may be feasible, as a compromise between representation accuracy and required calibration time.

Figure 7C:
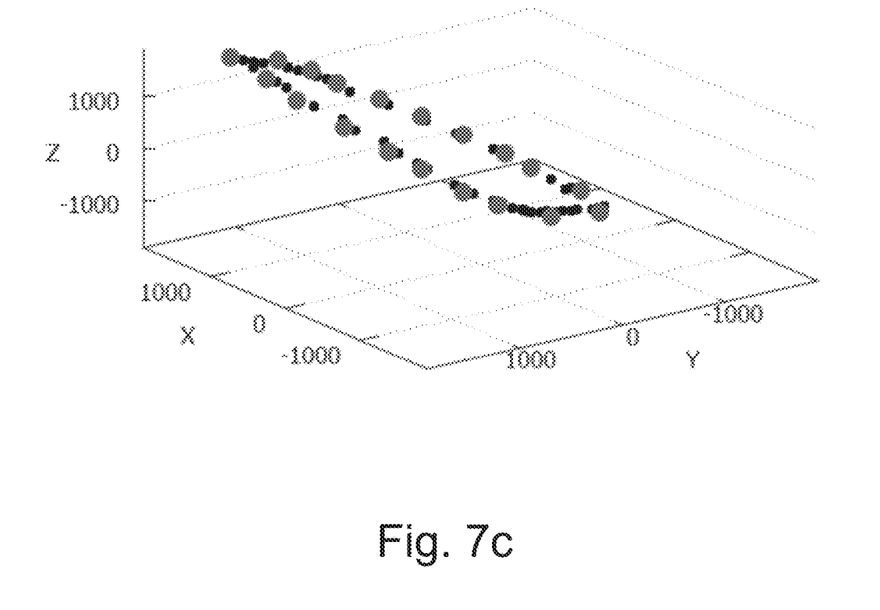
FIG. 7c depicts normalized colour data and stable values as they appear in time domain, wherein some calibration points being selected as representative points.

Because the colour data has been normalized to a nominal range in every axis of the three-dimensional coordinate system, it can be assumed that the circumference of the cycle is approximately $2\pi r = 2\pi 1000 \approx 6000$, when the colour values have been normalized within a range −1000-1000. Dividing this evenly by the chosen number of representative points (24 in this example), the mean distance between them may be obtained, which in this example is 250. For each incoming calibration point, the algorithm may locate the closest already existing representative point. If the distance is larger than the calculated mean distance (250), the calibration point itself is added as a new representative point. Otherwise the calibration point is assigned to the old representative point, and the point's location is adjusted by a small factor. In this way the representative points represent the average of the points in the vicinity. In FIG. 7c the representative points are illustrated as larger dots and other calibration points as smaller dots.

As part of collecting the representative points, a count of the number of calibration samples that land in the vicinity of each representative point may be kept. This gives an estimate of the point density. If an even distribution of phase angles is assumed, it gives the derivate of phase angle in the vicinity of that representative point.

Figure 7D:
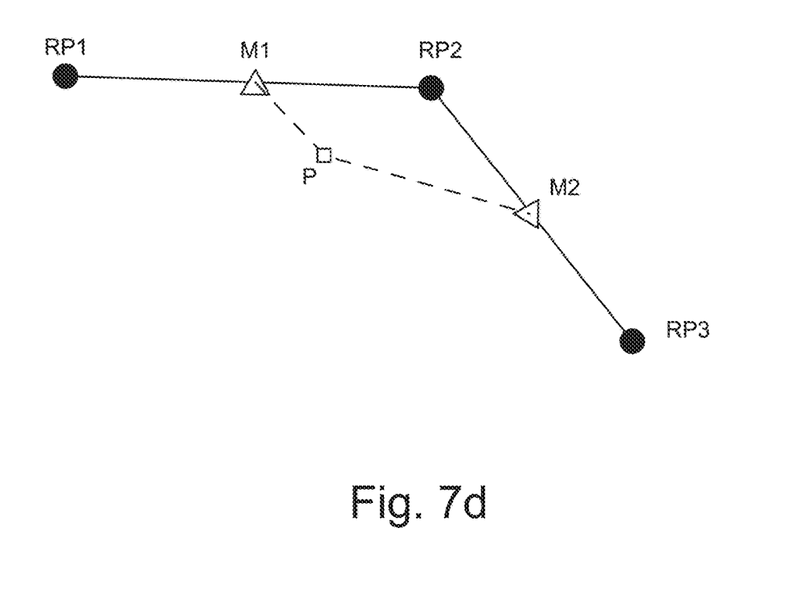
FIG. 7d depicts processing of a sample using a nearest representative point and its two neighbors in the cycle, in accordance with an embodiment.

By summing up the point densities starting from 0, and normalizing the end value to $2\pi \approx 6028$, two phase angle values for each representative point may be obtained: an angle when the cycle enters the vicinity of the point, and an angle when it leaves the vicinity. The end angle of each representative point equals the start angle of the next point. For each sample P to process, the nearest representative point RP2 and its two neighbors RP1, RP3 in the cycle may be obtained. wherein intermediate points M1, M2 may be calculated midway on segments RP1, RP2 and RP2, RP3 (FIG. 7d). These intermediate points M1, M2 correspond to the start and end phase angles of the representative point RP2.

The phase angle α of the input point P is calculated as a linear interpolation between the two midway-points M1 and M2 and their respective angles $\alpha_1$ and $\alpha_2$:

$$\alpha = \frac{\alpha_2 - \alpha_1}{\|p - m_1\| - \|p - m_2\|} \cdot \|p - m_2\| + \alpha_1$$

A frame change detector 609 takes as input timestamped phase angles and outputs frame display lengths and capture lengths (e.g. in microseconds). Calculating display times may be based on the frame change points the colour transition detector has already located.

In order to calculate capture times, the frame detector 609 may keep track of average phase angle delta per time delta, i.e. approximate rad_per_s value of the colour cycle. In accordance with an embodiment, a set of possible colour cycle rates may have been defined and these values may be known by the frame detector 609. Hence, the obtained average colour cycle rate may be rounded to the nearest known cycle rate value. The capture length may be computed as phase_angle_delta/rad_per_s and outputted 610 from the frame change detector 609 for further processing.

In accordance with an embodiment, the arrangement of FIG. 1a may also be applicable to determine latency of the system. However, the controlling device 1 and the measurement device 8 may need to be synchronized so that the measurement device 8 is able to deduce the phase of the optical signal produced by the optical signal generating device 2. This may be achieved e.g. so that both the controlling device 1 and the measurement device 8 have access to a time reference resource so that both devices are aware of the wall clock time. For example, both the controlling device 1 and the measurement device 8 may be able to receive ephemeris signals from a satellite positioning system such as GPS (Global Positioning System), wherein a universal time information (date and time of day) may be obtained on the basis of the ephemeris signals. Another option is to connect via the internet to a service which provides universal time information (e.g. to a network time protocol service). If the measurement device 8 also has information of a time when the optical signal generating device 2 generates a certain colour of the colour hue (e.g. the colour corresponding to 0°), the measurement device 8 may be able to deduce the moment of time when it should detect on the display 7 a frame containing that particular colour. The difference between the moment when the measurement device 8 actually detected such a frame and the expected moment of time reveal the latency (the delay) between the capturing device 3 and the display 7. However, it should be noted here that if the latency is longer than the length of the colour sequence, the so called aliasing effect may disturb the latency determination. This is due to the fact that if it takes longer time by the system to deliver the frames from the transmitting end to the receiving end than it takes to sweep through the full colour hue by the optical signal generating device, the display 7 does not display a frame captured during a previous colour sequence period until a next colour sequence period has been started at the trans-mitting end. This may be clarified by the following example. Let us assume that the optical signal generating device 2 produces at time t0 the colour which corresponds with 0° and that one period of the colour sequence may take 10 s. Hence, the same colour will be produced again 10 s later. If it takes more than 10 s to transmit and display the frame, let's say 12 s, the measurement device 8 may deduce that it took only 2 s to transmit the frame, which is clearly not correct in this example. Therefore, without any other synchronization than the universal time information the maximum latency which may be detected may be no longer than one period of the colour sequence.

To measure video latency and audio synchronization, a time marker may be incorporated to the colour waveform. An example solution is to switch the colour cycle direction at the same time as an audio marker is sent. By using the absolute value of the phase angle difference in the frame change detector it is unaffected by the direction change. The direction switching may be performed e.g. every 5 seconds, every 10 seconds, or using another appropriate interval. The measurement device 8 may then determine when the colour cycle have been reversed and measure the time difference between the detected change of direction and the received audio beep. This time difference reveals the synchronization difference between audio and video signals (a.k.a. lip sync). This arrangement makes also possible to measure a so called conversational latency (a.k.a. mouth to ear latency or end-to-end latency) which describes the time it takes from the transmission of audio (and possibly video) information to reconstruction the audio (and possibly video) information at the receiving end. Too long latency may make conversation too difficult.

Some non-limiting examples of some parts of the setup of FIG. 1a are now provided. The capturing device 3 and the first communication device 4 may be e.g. part of a mobile phone or a personal computer having a camera. The mobile phone and/or the personal computer may be able to run a video call application which receives frames captured by the camera and send the frames to the communication channel. The communication channel 5 may comprise a wireless network (e.g. a WLAN), a mobile phone network (e.g. GSM, GPRS, LTE), internet, etc. The second communication device 6 may also be part of a mobile phone or a personal computer having a camera.

Figure 1B:
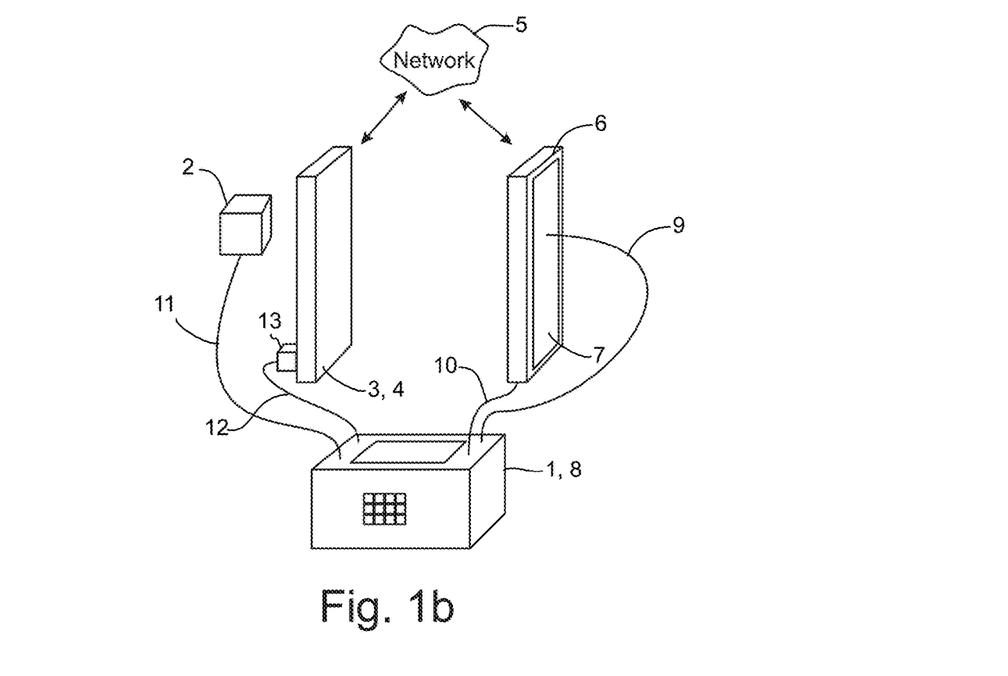
FIG. 1b is a conceptual drawing of a measurement setup according to another example embodiment.

In accordance with an embodiment separate controlling device 1 and measurement device 8 are not needed but they can be combined so that the same device controls the optical signal generating device 2 and performs tasks relating to the reconstructed frames on the display 7. FIG. 1b depicts an example of such arrangement. In other words, the measurement device 8 controls the optical signal generating device 2 to generate sequentially varying optical signal, and obtains information on the optical signal from the optical sensor. Hence, the measurement device 8 may store information on the moment of time when a certain optical signal was generated. The measurement device 8 may further store information on the moment of time when a corresponding optical signal was reconstructed by the display 7. The difference between these moments indicates the delay it takes to capture, transmit, receive and reconstruct the optical signal. This may be indicative of the latency of the communication channel 5 although the time difference may not directly reveal the latency but may include delays caused by the image capturing device 3, the first communication device 4, the second communication device 6 and the display 7. Thus, this arrangement may be capable of detecting latencies longer than one period of the colour sequence, because the aliasing effect may be eliminated.

In this embodiment the measurement device 8, the optical signal generating device 2, the capturing device 3, the first communication device 4, the second communication device 6 and the display 7 may be located near each other, e.g. in the same room so that the measurement device 8 has access to the optical signal generating device 2 and the display 7. The first communication device 4 and the second communication device 6 may be communicating with the same communication network or with different networks but in such a way that a data transmission connection may be formed between the first communication device 4 and the second communication device 6.

On the other hand, the controlling device 1 and the measurement device 8 may be separate devices but they are located near each other so that the controlling device 1 may indicate the measurement device 8 the actual phase of the optical signal generating device 2. Therefore, this arrangement may be capable of detecting latencies longer than one period of the colour sequence, because the aliasing effect may be eliminated.

Figure 3A:
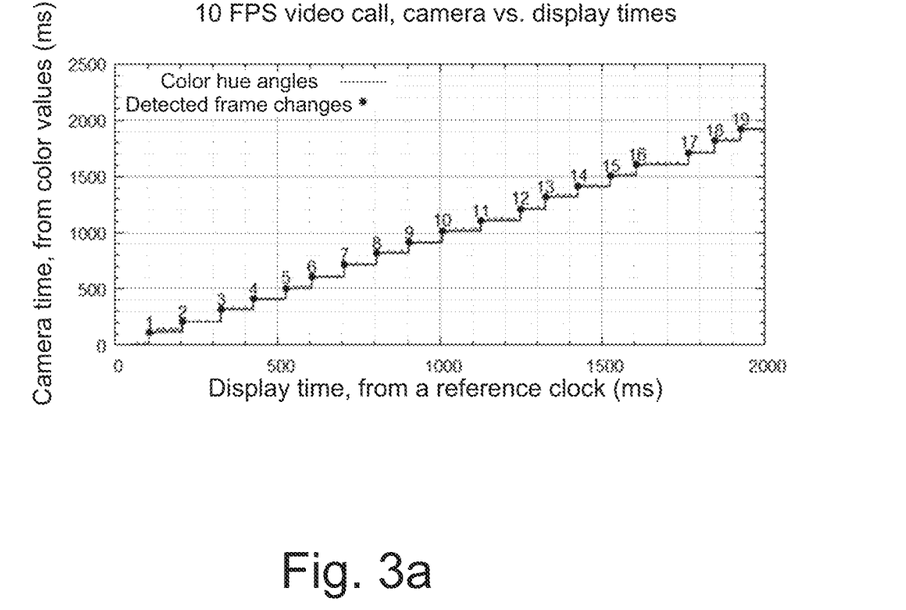
FIGS. 3a and 3b show an example of measurement results using a video call between two devices.
Figure 3B:
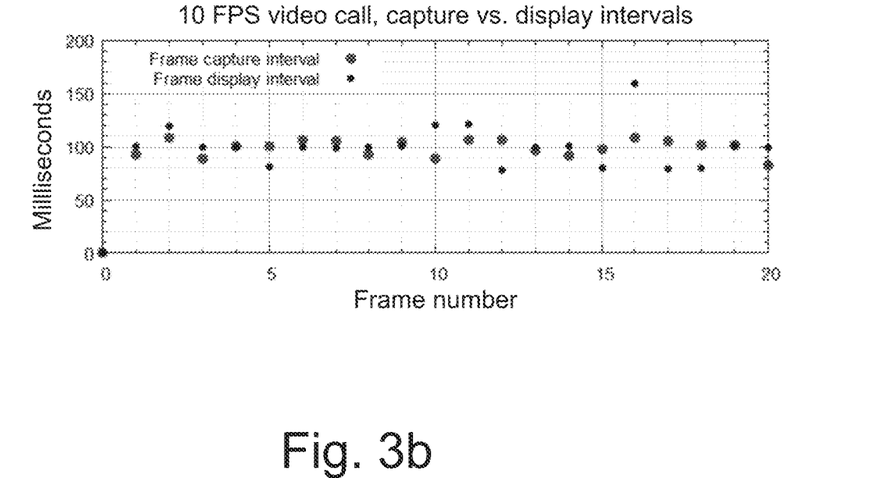

FIGS. 3a and 3b show an example of measurement results using a video call between two devices. In FIG. 3a camera vs display times are depicted as a diagram. The lines illustrate detected colour hue angles of the colour indicator and dots illustrate detected frame changes. In FIG. 3b the x-axis indicates frame numbers and y-axis indicates display times of the frames. In this example the call was established using 10 fps frame rate, wherein the image capturing device 3 i.e. the camera of the transmitting mobile phone, was capturing frames at the native frame rate of the camera and the video call application picks frames to create the 10 fps frame rate. It can be seen that there is a longer delay between detected frames no 16 and 17. This may be due to long delay in either transmitting or displaying the frame no 17.

Figure 4A:
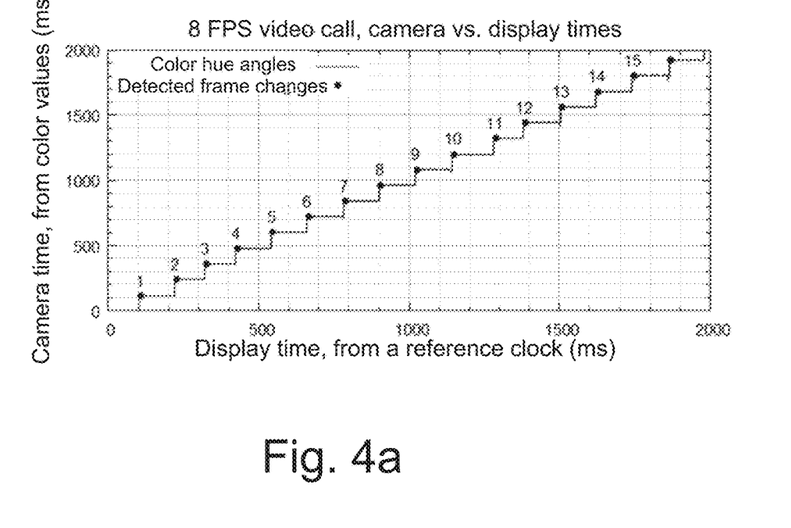
FIGS. 4a and 4b show another example of measurement results using a video call between two devices.
Figure 4B:
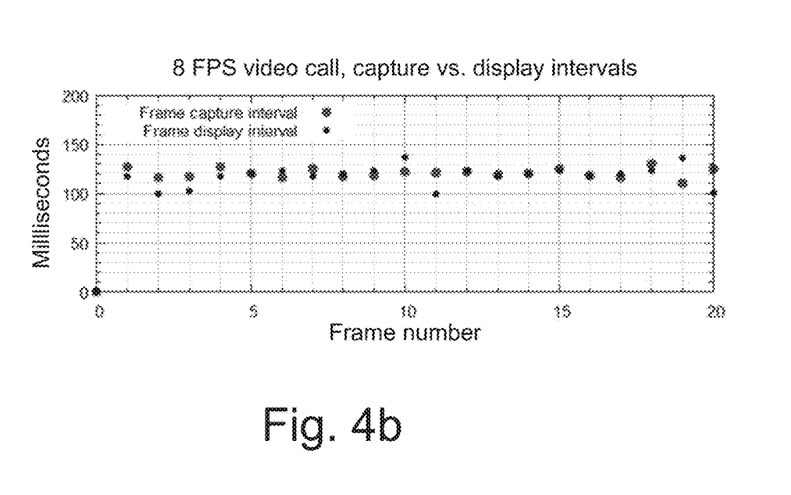

FIGS. 4a and 4b show another example of measurement results using a video call between two devices. In FIG. 4a camera vs display times are depicted as a diagram. The lines illustrate detected colour hue angles of the colour indicator and dots illustrate detected frame changes. In FIG. 4b the x-axis indicates frame numbers and y-axis indicates display times of the frames. In this example the call was established using 8 fps frame rate, wherein the image capturing device 3 i.e. the camera of the transmitting mobile phone, was capturing frames at the native frame rate of the camera and the video call application picks frames to create the 8 fps frame rate. It can be seen that the average value of frame display intervals is quite constant. One reason for this may be the slower frame rate wherein the system may have more time for processing each frame.

In accordance with an embodiment also audio signals may be used in the testing procedure. For example, the controlling device 1 generates an audio signal which may be amplified by an amplifier 1.11, if necessary, and coupled e.g. via a cable 12 to a loudspeaker 13. If a controller 1.1 (FIG. 5*a*) is not able to produce analog signals but digital signals to represent the audio signal, the digital signals generated by the controller may need to be converted to analog signals by a digital-to-analog converter 1.12. The loudspeaker may, for example, be located in the same casing than the optical signal generating device, or it may be in a separate casing as illustrated in FIGS. 1*a* and 1*b*. A microphone of the first communication device 4 captures the audio signals, wherein the first communication device 4 transmits them to the communication network 5 to be delivered to the second communication device 6. The second communication device 6 receives also the audio signals and may generate corresponding audible signal by a loudspeaker (not shown). However, the audio signal may be captured as an electric signal via an audio connector of the second communication device 6 (not shown) and coupled e.g. via a cable 10 to the measurement device 8 for analyses. It may be necessary to convert the received analog audio signal into digital form before analyses. This may be performed e.g. by an analog-to-digital converter 8.10 (ADC).

The audio signal based analyses may be performed e.g. in such a way that the controlling device 1 generates the audio signal in synchronism with the colour sequence. For example, a tone having a certain frequency may be generated each time the colour sequence has proceeded 6°. The measurement device 8 may then utilize this information to determine whether the audio signal is in synchronism with the video frames or not.

FIG. 5*a* depicts as a simplified block diagram some details of the controlling device 1 according to an example embodiment. The device 1 comprises a controller 1.1 adapted to control at least some of the operations of the controlling device 1. There may also be a memory 1.2 for storing data and/or computer code for controlling the operation of the controller 1.1. The controller 1.1 may be a processor such as a CPU (Central Processing Unit) or another kind of apparatus capable of executing computer code. The device may also have a user interface 1.3 (UI) which may comprise a display 1.4 and a keyboard 1.5 or some control keys. The device further comprises a colour control output 1.6 which provides electrical signals to the optical signal generating device 2. These electrical signals may be digital or analog signals. As an example, the electrical signal comprises certain number of bits which indicate the optical signal generating device 2 the intensity of light to be generated by three different colour leds (light emitting diodes). Hence a first group of 8 bits may indicate the intensity of red colour, a second group of 8 bits may indicate the intensity of green colour, and a third group of 8 bits may indicate the intensity of blue colour. In this option, the signal generating device 2 may need a converter to convert the digital signals into appropriate analog signals for the leds.

In accordance with an embodiment, the controlling device 1 outputs three analog signals to the optical signal generating device 2, wherein each output may be coupled to one led of the signal generating device 2. In this embodiment, the digital colour information generated by the controller 1.1 may be converted to analog signals by analog/digital converters 1.9 (DAC).

There may be filters 1.10 which may smooth the analog signals before they are output to the signal generating device 2.

The controlling device 1 may further comprise communication means 1.7 to communicate with a communication network such as a mobile communication network, a wireless LAN and/or the internet.

In accordance with an embodiment, the controlling device 1 may, instead of or in addition to the communication means 1.7, comprise a satellite positioning receiver 1.8 adapted to receive signals from a satellite positioning system to e.g. retrieve a time reference for the synchronization purposes.

Figure 5B:
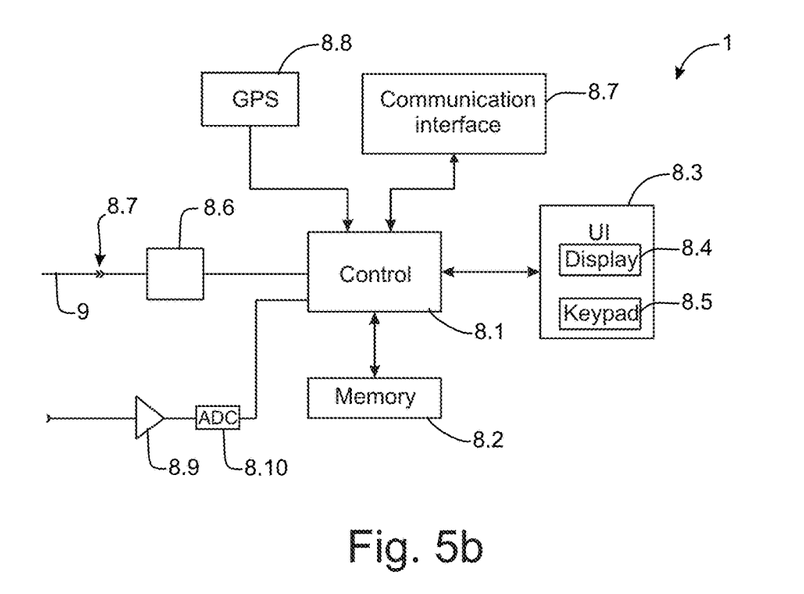
FIG. 5b depicts as a simplified block diagrams a measurement device according to an example embodiment.

FIG. 5*b* depicts as a simplified block diagram some details of the measurement device 8 according to an example embodiment. The device 8 comprises a controller 8.1 adapted to control at least some of the operations of the measurement device 8. There may also be a memory 8.2 for storing data and/or computer code for controlling the operation of the controller 8.1. The controller 8.1 may be a processor such as a CPU (Central Processing Unit) or another kind of apparatus capable of executing computer code. The device may also have a user interface 8.3 which may comprise a display 8.4 and a keyboard 8.5 or some control keys. The device further comprises an optical sensor 8.6 which converts optical signals into digital form and provides these digital signals to the controller 8.1 for analyses purposes. In other words, the optical sensor 8.6 operates as a opto/electric converter. The optical sensor 8.6 is preferably capable for generating such a digital signal which is able to indicate colour and intensity of the detected optical signal. For example, the optical sensor 8.6 may produce three different digital signals in which a first signal is indicative of the brightness of a red component, a second signal is indicative of the brightness of a green component, and a third signal is indicative of the brightness of a blue component of the detected optical signal, Hence, the combination of these three signals may reveal the angle value of the colour in the hue. However, there may also be other ways to convert the optical signal into the angle of colour representation.

In accordance with an embodiment, the controlling device 8 may omprise a connector for an optical fibre 10 via which the optical signal may be picked from the display 7 and fed to the optical sensor 8.6.

The controlling device 8 may further comprise communication means 8.7 to communicate with a communication network such as a mobile communication network, a wireless LAN and/or the internet.

In accordance with an embodiment, the controlling device 8 may, instead of or in addition to the communication means 8.7, yet comprise a satellite positioning receiver 8.8 adapted to receive signals from a satellite positioning system to e.g. retrieve a time reference for the synchronization purposes.

As was mentioned above, the same apparatus may be able to perform operations of both the controlling device 1 and the measurement device 8, wherein also some circuitry may be common for both operations. As an example, one controller may be able to perform tasks relating to the colour hue generation and to the displayed colour recognition.

The measurement system described above may be used to test many kinds of systems and applications and their end-to-end performance. Some non-limiting examples are video calls, video conferencing, video over LTE, WiFi, multimedia messaging, IP-camera systems, etc. Some other applications to be mentioned here are different kinds of camera systems for vehicles, such as back-up cameras and other cameras in cars, moving work machines, buses, lorries etc. The measurement system may be used to measure the latency and/or frame capture/display rates from the camera to a display, etc.

In accordance with an embodiment, the measurement system may also be used to analyse lip sync and/or frame capture/display rates on the basis of a video captured and stored by a mobile device such as a digital camera, a mobile phone, etc. This kind of testing and analysing is also possible when the device is off-line.

It should be noted that according to an example embodiment the testing arrangement may also be used to perform similar tests in the other way around, if similar apparatuses are used at both ends. In other words, there is another optical signal generating device 2 to be controlled by the device 8, herein the second communication device 6 may capture frames from the optical signal and transmit it to the first communication device 4, and the device 1 performs similar measurement operations than the measurement device 8 in the arrangement of FIG. 1a.

The aspects of the disclosed embodiments is not limited to the above described embodiments but can be modified within the scope of the appended claims.

The invention claimed is:

1. A method for testing comprising:
   generating optical signal the colour of which varies by sweeping through a certain colour range;
   capturing the optical signal at intervals by a first optical sensor to generate frames from the captured optical signal;
   transmitting the frames by a first communication device to be received by a second communication device;
   receiving one or more of the transmitted frames by the second communication device;
   providing the received frames to a display of the second communication device to reconstruct the frames on the display;
   obtaining by a second optical sensor colour information of frames displayed by the display at intervals;
   comparing colour information of successive reconstructed frames to determine one or more of the following:
      deviation in capture rate of two successive frames of the first optical sensor;
      a delay between capturing a frame by the first optical sensor and displaying the frame by the display;
      deviation in display rate of two successive frames displayed by the display;
      a loss of a frame.

2. The method according to claim 1 further comprising:
   varying the colour of the optical signal so that the optical signal sweeps through different colours of the colour hue, one sweep-through forming one sequence of colours; and
   periodically repeating the sequence.

3. The method according to claim 1 comprising:
   varying the colour faster than an expected capture rate of the optical sensor.

4. The method according to claim 1, said determining the deviation in capture rate comprising:
   defining a difference between colours of two successively displayed frames; and
   comparing the difference with an expected difference.

5. The method according to claim 1 comprising:
   defining the colour as an angle value within the colour hue.

6. The method according to claim 1, said determining the delay comprising:
   determining capture time of a captured frame;
   determining the colour of the captured frame;
   determining display time of a reconstructed frame having the same colour than the captured frame; and
   determining the deviation on the basis of a difference between the display time and the capture time.

7. The method according to claim 1, said determining the deviation in display rate comprising:
   capturing visual information displayed by the display until a change in the colour of the visual information has been detected;
   determining the moment of time of the change indicative of a display time of a first frame;
   capturing visual information displayed by the display until another change in the colour of the visual information has been detected;
   determining the moment of time of the other change indicative of a display time of a second frame;
   using the difference between the display time of the second frame and the display time of the first frame to find out an actual display rate; and
   determining the deviation of display rate on the basis of difference between the actual display rate and an expected display rate.

8. The method according to claim 1 further comprising:
   changing a direction of the variation of the colour of the optical signal and sending an audio marker;
   determining from the visual information displayed by the display a first moment of time representing the moment when the direction of the variation of the colour changes;
   determining a second moment of time representing the moment when the audio marker has been received; and
   using a time difference between the second moment of time and the first moment of time to determine at least one of video latency, conversational latency, synchronization between video and audio, and audio synchronization.

9. A system for testing comprising:
   an optical signal generating device adapted to generate optical signal the colour of which varies by sweeping through a certain colour range;
   a first optical sensor adapted to capture the optical signal at intervals to generate frames from the captured optical signal;
   a first communication device adapted to transmit the frames to be received by a second communication device;
   the second communication device (6) comprising a receiver for receiving one or more of the transmitted frames and a display to reconstruct the received frames on the display;
   wherein the system further comprises:
   a second optical sensor adapted to obtain colour information of frames displayed by the display at intervals;
   a comparator adapted to compare colour information of successive reconstructed frames to determine one or more of the following:
      deviation in capture rates of two successive frames of the first optical sensor;
      a delay between capturing a frame by the first optical sensor and and displaying the frame by the display;
      deviation in display rates of two successive frames displayed by the display;
      a loss of a frame.

10. The system according to claim 9 comprising:
means for generating the optical signal of varying colour.

11. The system according to claim 10 wherein:
said means for generating the optical signal of varying colour are adapted to change the colour faster than an expected capture rate of the capturing device.

12. The apparatus according to claim 9, further comprising:
means for changing a direction of the variation of the colour of the optical signal; and
means for sending an audio marker in synchronism with the change of the direction of the variation of the colour of the optical signal.

13. An apparatus for testing comprising:
an optical sensor adapted to obtain colour information of frames displayed by a display of a communication device, the frames carrying information formed on the basis of an optical signal of variable colour captured by a capturing device ; and
a comparator adapted to compare the colour information of successive frames reconstructed and displayed by the communication device to determine one or more of the following:
deviation in capture rates of two successive frames displayed by the display;
a delay between capturing a frame displayed by the display and displaying the frame;
deviation in display rates of two successive frames displayed by the display;
a loss of a frame.

14. The apparatus according to claim 13 comprising:
a first element adapted to determine from the colour information displayed by the display a first moment of time representing the moment when the direction of the variation of the colour changes;
a receiver adapted to receive an audio signal;
a second element adapted to examine the received audio signal to detect an audio marker;
the first element further adapted to determine a second moment of time representing the moment when the audio marker has been received; and
a third element adapted to use a time difference between the second moment of time and the first moment of time to determine at least one of video latency, conversational latency, synchronization between video and audio, and audio synchronization.

15. A computer program product for testing including one or more sequences of one or more instructions which, when executed by one or more processors, cause an apparatus or a system to perform at least the following:
obtain colour information of frames displayed by a display of a communication device, the frames carrying information formed on the basis of an optical signal of variable colour captured by a capturing device; and
comparing the colour information of successive frames reconstructed and displayed by the communication device to determine one or more of the following:
deviation in capture rates of two successive frames displayed by the display;
a delay between capturing a frame displayed by the display and displaying the frame;
deviation in display rates of two successive frames displayed by the display;
a loss of a frame.

* * * * *